July 17, 1962 E. H. BRAUER, JR 3,044,090
WORK LOAD AND UNLOAD DEVICE
Filed Aug. 6, 1959 2 Sheets-Sheet 1

INVENTOR.
EDWIN H. BRAUER, JR.
BY
Oberlin, Maky & Donnelly
ATTORNEYS

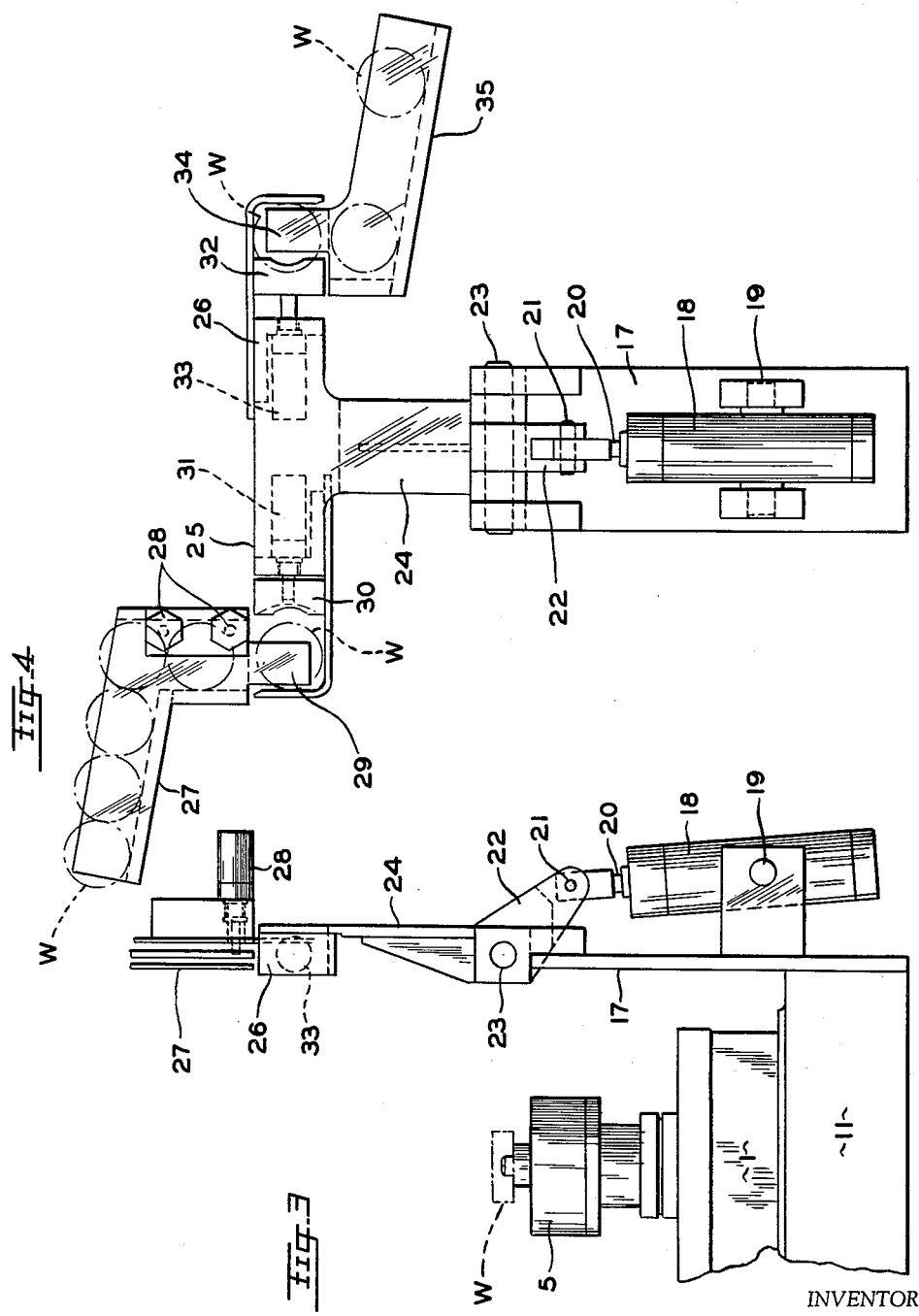

United States Patent Office 3,044,090
Patented July 17, 1962

3,044,090
WORK LOAD AND UNLOAD DEVICE
Edwin H. Brauer, Jr., Cleveland, Ohio, assignor to The Osborn Manufacturing Company, Cleveland, Ohio, a corporation of Ohio
Filed Aug. 6, 1959, Ser. No. 832,063
9 Claims. (Cl. 15—21)

This invention relates as indicated to a novel work loading and unloading device, and more particularly to a mechanism operative to remove a work-piece from one chuck, spindle or the like while simultaneously placing a new work-piece on an adjacent chuck or spindle.

Power driven rotary brushes are being employed in an increasing degree in the processing of work-pieces such as gears, for example, to remove burrs produced in the gear cutting operation, to blend sharp corners and angles and to provide a superior surface finish. Reference may be had, for example, to Nelson et al. Patent 2,682,065 which discloses a superior form of work-piece holder operative to present such work-pieces to the rotating brushes and also to the application of Lyndon C. Cole, Serial No. 679,720, filed August 22, 1957, for "Power Brushing Machine," now Patent No. 2,909,015, disclosing a brushing head of the general type which may, for example, be employed for such purpose. Brushing heads or power brushing machines of this general type may be mounted alongside work carrying turntables which, when indexed in known manner, carry successive work-pieces into position for engagement by the power driven rotary brushes.

In view of the foregoing, it is a particular object of my invention to provide a work loading and unloading device operative to remove finished work-pieces from the chucks, spindles or the like on the work-piece conveying means such as a rotary turntable while simultaneously placing a new work-piece on an adjacent chuck or spindle for processing through the cycle of the machine.

Another object is to provide such mechanism which will be of simple construction and automatic in operation.

A further object is to provide such mechanism which is particularly adapted to handle a series of identical work-pieces such as gears or the like.

Still another object is to provide work clamping means which will properly position the work-pieces while holding them in a manner exposing them for proper chucking on the work-piece conveying mechanism of the machine.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 3 is a fragmentary side elevation on an enlarged scale of the work loading and unloading mechanism; and FIG. 4 is an elevation of such work loading and unloading mechanism taken at right angles to FIG. 3, all such figures showing the work loading and unloading mechanism in the work-piece receiving and discharging position.

Figure 1:
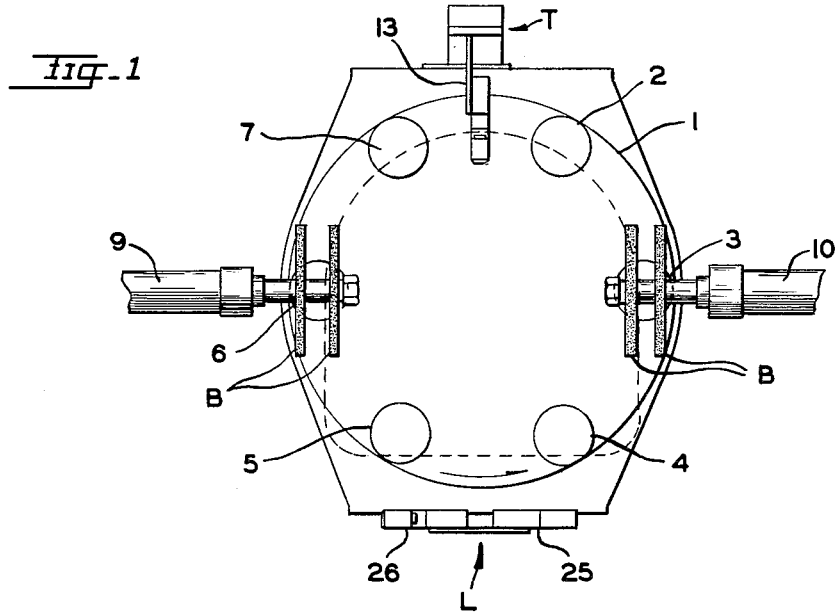
FIG. 1 is a semi-diagrammatic top plan view showing a work transporting turntable with two diametrically oppositely disposed power brushing stations, a loading and unloading station, and a work turnover station.
Figure 2:
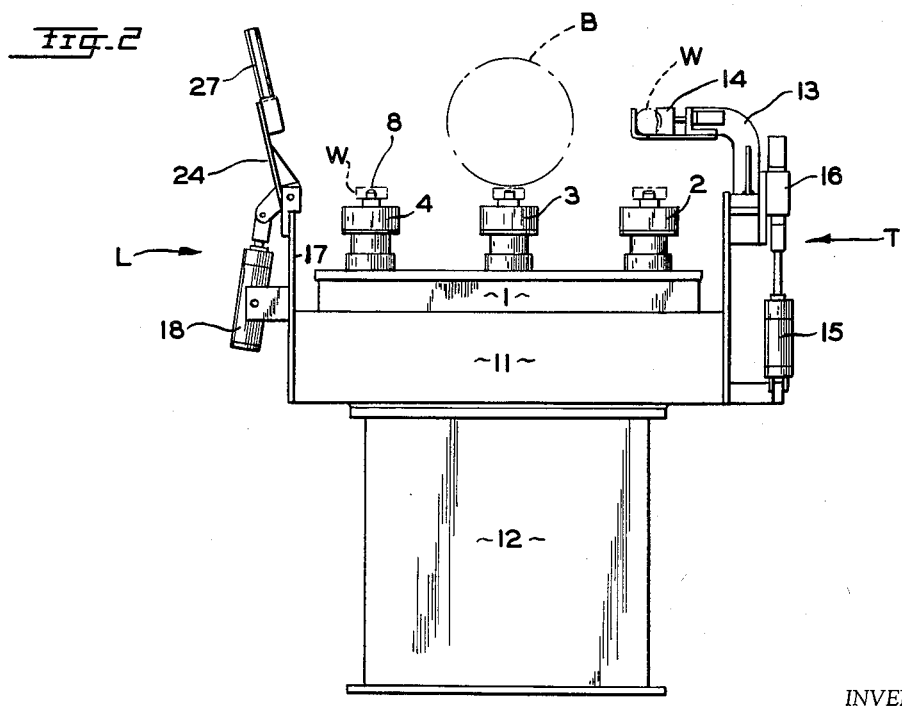
FIG. 2 is a side elevation of such turntable and the work loading and unloading mechanism of this invention and the work turnover mechanism assembled therewith.

Referring now more particularly to such drawing and especially FIGS. 1 and 2 thereof, the work loading and unloading mechanism of my invention may be mounted for cooperation with a turntable 1 adapted to be indexed from station to station about a vertical axis by means of a commercially available Geneva movement drive mechanism or the like (not shown). Such turntable may be provided with a plurality of equally spaced vertically extending work carrying spindles 2, 3, 4, 5, 6 and 7 provided with expanding chucks such as 8 on which a work-piece such as gear W may be secured for deburring or the like through the action of power driven rotary brushes B carried by the horizontally extending spindles of brushing lathes 9 and 10 independently mounted at diametrically opposite sides of turntable 1. The work carrying spindles and their chucks 8 may desirably be rotated about their vertical axes at the brushing stations in well-known manner to ensure uniform action of the brushes B upon the work-pieces.

Turntable 1 is carried by a frame 11 supported by a base 12. Such frame 11 projects laterally beyond the edge of turntable 1 in regions diametrically opposed to one another and 90° removed from the two brushing stations above defined. On one such projecting portion of underframe 11 is mounted a work loading and unloading mechanism L, and diametrically opposite thereto is mounted a work turnover mechanism T. The position of such turnover mechanism, when one is employed, may vary, however, depending principally on the number and location of the various work stations.

The work turnover mechanism T is described and claimed in my co-pending application Serial No. 832,064, filed August 6, 1959, entitled "Work Turnover Mechanism." Briefly, it may comprise a swinging L-shaped arm 13 having an air operated clamp 14 at its extremity extending inwardly over the turntable, the length of such arm being such that when it is rocked from one horizontal position to the other, its outer end portion clamping the work-piece will directly overlie spindles 2 and 7 respectively as shown in FIG. 1. Such arm 13 is adapted thus to be rocked by means of a pneumatic piston-cylinder assembly 15 operating through rack and pinion mechanism 16. The clamp 14 engages a work-piece on spindle 2 (the upper surface of which has been brushed by the brushes of brushing lathe 10) and arm 13 is rocked to carry the work-piece to the upper position shown in FIG. 2. The turntable is then indexed one station to carry the vacated spindle 2 into the spindle 7 position as shown in FIG. 1 whereupon oscillation of arm 13 is completed to deposit the work-piece on the same spindle as before but in inverted position so that the other side of the work-piece will be engaged by the brushes of brushing lathe 9. Alternatively, the arm 13 may be rocked a full 180° to carry the work from the spindle 2 to the spindle 7 position in one continuous movement.

Referring now more particularly to FIGS. 3 and 4 of the drawing, the embodiment of my invention there illustrated comprises an upstanding post or bracket 17 welded to the laterally projecting portion of stationary underframe 11 diametrically opposite to the work turnover station T. A pneumatic cylinder 18 is pivotally mounted in horizontal trunnions 19 on such post and the rod 20 of its piston is pivotally connected at 21 to arm 22 keyed to pivot pin 23 journalled at the upper end of post 17 and also having keyed thereto an upstanding T-shaped arm 24. Actuation of cylinder 18 is accordingly operative through lever arm 22 to rock upstanding arm 24 about pivot 23 from a position slightly past vertical (as seen in FIG. 2) to a horizontal position with the respective ends of the T-shaped arm 24 overlying spindles 4 and 5 on turntable 1. The axis of pivot 23 is tangential to turntable 1.

As best shown in FIG. 4, arm 24 is of general T-shape having two horizontal branches 25 and 26. The work-pieces such as gears W may be caused to roll down an inclined loading chute 27 to be deposited one at a time onto arm 25 by means of a conventional escapement 28. Such loading chute 27 is not only inclined to cause the work-pieces to roll or slide therealong, but is also tilted slightly away from turntable 1 as shown in FIG. 2 so that the work-pieces will be correspondingly tilted as they are deposited upon arm 25. Depending from chute 27 at the side thereof away from turntable 1 is a tongue or backstop 29 against which the work-piece W reclines when thus deposited on arm 25 prior to being engaged by horizontally reciprocating clamp 30 reciprocated by pneumatic piston-cylinder assembly 31.

Cylinder 18 may now be actuated to rock arm 24 into horizontal position over turntable 1 so that the new work-piece on horizontal loading arm 25 held by clamp 30 will be deposited on the chuck of spindle 4 (FIG. 1), clamp 30, of course, being released when the work-piece has been thus chucked. Simultaneously, clamp 32 operated by pneumatic piston-cylinder assembly 33 on arm 26 is actuated to grip a finished brushed work-piece on spindle 5 so that when arm 24 is now again rocked slightly past vertical to its initial starting position as shown in FIG. 2, the finished work-piece carried by clamp 32 will be in the position shown in FIG. 4 reclining against the upstanding slightly tilted tongue or backstop 34 on discharge chute 35. Upon now actuating piston-cylinder assembly 33 to retract clamp 32, the finished work-piece is dropped (sliding against backstop 34) down into the trough-like discharge chute 35.

It will be noted that the loading chute 27 and the discharge chute 35 are similar in concept, one being inverted relative to the other, and similarly, the clamp on horizontal loading arm 25 is open upwardly to receive a work-piece dropped thereon whereas the clamp at the end of horizontal unloading arm 26 is open downwardly to drop the finished work-piece into discharge chute 35 when jaw 32 is retracted. By tilting chutes 27 and 35 as well as arm 24 slightly away from the turntable, the work-pieces are positively positioned by the respective backstops 29 and 34 prior to clamping and immediately after unclamping ensuring trouble-free operation of the mechanism and permitting relatively high speeds of operation. Arms 25 and 26 in effect define a chord on the index table between two adjoining work spindles when arm 24 is swung down into horizontal position. Since one arm removes a finished work-piece from the spindle 5 immediately preceding the empty spindle 4 upon which a new work-piece is simultaneously deposited, it is apparent that upon the next index movement of the turntable such emptied spindle 5 will be brought to the spindle 4 position (FIG. 1) ready itself to have a new work-piece deposited thereon.

Following a single work-piece through a complete cycle of operation, it will be seen that such work-piece is first deposited in loading clamp 30 of arm 25 whereupon arm 24 is swung down to deposit such work-piece on the chuck at the spindle 4 position as seen in FIG. 1. When the table is next indexed, such work-piece will be carried beneath the brushes B of the brushing lathe 10 and may be rotated about its vertical axis to ensure uniform brushing of its upper surface and exposed corners, etc. The work-piece is thereupon indexed to the spindle 2 position where the clamp on the end of arm 13 may be swung down to engage and pick up the same, temporarily lifting the work-piece from the spindle and carrying it to the elevated intermediate position shown in FIG. 2. The turntable is again indexed, carrying the vacated spindle from the spindle 2 position to the spindle 7 position whereupon the turnover device is further actuated to swing arm 13 through the remaining 90° of its arc again to deposit the work-piece upon the same spindle but now in inverted position. The turntable is again indexed to carry the work-piece beneath the brushes of brushing lathe 9, and the spindle may be rotated about its vertical axis while the brushes operate upon the newly exposed upper surface of the work-piece. The next index movement of the turntable carries the completely brushed work-piece to the spindle 5 position where it is gripped by clamp 32 of arm 26 and lifted from the spindle to be carried slightly past vertical into the position indicated in FIGS. 2 and 4 where it is then released and discharged down delivery chute 35.

It will be seen from an inspection of FIG. 1 that the work carrying spindles are so arranged and spaced that while the rotary brushes or other appropriate tools are operating upon the upper faces of the work-pieces supported by the spindles directly therebeneath, the other four spindles are positioned in pairs with one spindle at each side of the loading station (spindles 4 and 5) and one spindle at each side of the turnover station (spindles 2 and 7).

It will be seen that I have provided a work-piece loading and unloading mechanism or device particularly adapted for employment in conjunction with automatic or semi-automatic work-piece conveying and abrading mechanisms. It will also be appreciated that instead of power driven rotary brushes, various other appropriate tools such as grinding wheels, buffs, drills, milling cutters and the like may be employed at the respective work stations. Likewise, the operations performed upon the respective sides of the work-piece need not necessarily be identical.

The clamp carrying cross-arm is, of course, parallel to the pivot of the rocking or oscillating arm, such pivot in turn being tangential to the turntable. While various types of work indexing or conveying means may be employed, the loading and unloading mechanism if this invention is particularly suitable and efficient in conjunction with such turntable. Expanding internal chucks will ordinarily be provided on the turntable when the work-pieces are gears or the like, but the chucks or spindles employed will naturally be selected with regard to the particular work-piece to be handled. Instead of the escapement in the loading chute, any other suitable means may be utilized to deliver the work-pieces one at a time to the loading clamp.

Other modes of applying the principle of the invention may be employed, change being made as regards the details described, provided the features stated in any of the following claims or the equivalent of such be employed.

I therefore particularly point out and distinctly claim as my invention:

1. Work loading and unloading mechanism adapted simultaneously to load a work-piece upon work-piece indexing means while unloading another work-piece from an adjacent portion of said indexing means comprising a fixed base, an arm mounted thereon for rocking movement from a horizontal position upwardly slightly past a vertical position, a horizontal cross-arm on said rocking arm having an upwardly open clamp adjacent one of its ends and a downwardly open clamp adjacent the other end thereof when in elevated position, a loading chute above said upwardly open clamp and a discharge chute beneath said downwardly open clamp in such elevated position of said rocking arm slightly past vertical, said chutes being similarly tilted, a depending tongue at the lower end of said loading chute adapted to assist in supporting a work-piece reclining thereagainst during deposition into said upwardly open clamp, an upstanding tongue at the upper end of said discharge chute adapted to serve as a backstop supporting a work-piece reclining thereagainst during discharge from said downwardly open clamp into said discharge chute, means operative to actuate said clamps to grip and release such work-piece, and power means operative to rock said rocking arm back and forth between such horizontal position and such position slightly past vertical.

2. The mechanism of claim 1, wherein said loading chute is provided with an escapement to release one work-piece at a time to said upwardly open clamp, and said power means is a fluid pressure piston-cylinder assembly.

3. Work loading and unloading mechanism adapted simultaneously to load a work-piece upon work-piece indexing means while unloading another work-piece from an adjacent portion of said indexing means comprising a fixed base, an arm mounted thereon for rocking movement upwardly from a horizontal position to a tilted position intermediate horizontal and vertical, an upwardly open clamp and a downwardly open clamp carried by said arm in such tilted position, a loading chute above said upwardly open clamp and a discharge chute beneath said downwardly open clamp in such tilted position of said arm, tilted backstops against which such work-pieces are adapted to recline when sliding from said loading chute into said upwardly open clamp and from said downwardly open clamp into said discharge chute respectively, means operative to actuate said clamps to grip and release such work-piece, and power means operative to rock said arm between such horizontal position and such tilted position.

4. The mechanism of claim 3, wherein said clamps are open laterally as well as upwardly and downwardly respectively, to facilitate placement on and removal from said indexing means.

5. In work treating mechanism including a turntable, spaced work carrying spindles on said turntable adapted to be indexed from station to station as such turntable is rotated, and at least one power operated tool at one such station adapted to engage and perform an operation upon a work-piece on a corresponding spindle; work loading and unloading mechanism adapted simultaneously to load a work-piece upon one said spindle while unloading another work-piece from an adjacent said spindle comprising a base, an arm mounted thereon for rocking movement upwardly from a horizontal position to a tilted position intermediate horizontal and vertical, an upwardly open clamp and a downwardly open clamp carried by said arm in such tilted position, means operative to actuate said clamps to grip and release such work-piece, a loading chute above said upwardly open clamp and a discharge chute beneath said downwardly open clamp in such tilted position of said arm, tilted backstops against which such work-pieces are adapted to recline when sliding from said loading chute into said upwardly open clamp and from said downwardly open clamp into said discharge chute respectively, and power means operative to rock said arm between such horizontal position and such tilted position, said clamps being open laterally as well as upwardly and downwardly respectively and being spaced apart a distance equal to the distance between adjacent said spindles, and said arm being thus pivoted for rocking movement about an axis tangential to said turntable and movement about an axis tangential to said turntable and dimensioned to register said respective clamps with such respective adjacent spindles when in such horizontal position in order that said upwardly open clamp may release a work-piece on one said spindle while said downwardly open clamp may seize a work-piece on such adjacent spindle.

6. The mechanism of claim 5, wherein said power means is a fluid pressure piston-cylinder assembly.

7. In work treating mechanism including a work-piece indexing conveyor operative to index work-pieces from station to station, at least one such station being a work-piece treating station; work loading and unloading mechanism operative simultaneously to load a work-piece on said conveyor while unloading a treated work-piece therefrom comprising an oscillating member mounted for oscillation between a position adjacent said conveyor and a position removed from said conveyor, a loading clamp and an unloading clamp carried by said member having clamping jaws movable in a direction parallel to the axis of oscillation of said oscillating member, said loading clamp being operative to receive and clamp a work-piece when in such position removed from said conveyor and to release such work-piece when in such position adjacent said conveyor, said unloading clamp being operative to clamp a work-piece on said conveyor when adjacent thereto and to release and drop such work-piece when in such position removed from said conveyor, a discharge chute positioned to receive such work-piece where thus dropped, and power means operative to oscillate said member.

8. The mechanism of claim 7, wherein said loading and unloading clamps are each formed with clamping jaws shaped and disposed to receive and clamp a work-piece introduced therein in one direction, and to unclamp and release such work-piece in a different direction relative to said respective clamps.

9. The mechanism of claim 7, wherein said loading and unloading clamps are each formed with clamping jaws shaped and disposed to receive and clamp a work-piece introduced therein in one direction, and to unclamp and release such work-piece in a different direction at right angles to the aforesaid direction relative to said respective clamps.

References Cited in the file of this patent

UNITED STATES PATENTS

| | | |
|---|---|---|
| 407,161 | Brooks | July 16, 1889 |
| 1,644,386 | Kendall | Oct. 4, 1927 |